(12) United States Patent
Chesnokov

(10) Patent No.: US 10,362,338 B2
(45) Date of Patent: Jul. 23, 2019

(54) IMAGE PROCESSING

(71) Applicant: Apical Ltd, Cambridge (GB)

(72) Inventor: Viacheslav Chesnokov, Loughborough (GB)

(73) Assignee: Apical Limited, Cambridge (GB)

(*) Notice: Subject to any disclaimer, the term of this patent is extended or adjusted under 35 U.S.C. 154(b) by 35 days.

(21) Appl. No.: 15/716,378

(22) Filed: Sep. 26, 2017

(65) Prior Publication Data
US 2018/0098098 A1    Apr. 5, 2018

(30) Foreign Application Priority Data

Sep. 30, 2016   (GB) .................................. 1616719.9

(51) Int. Cl.
| | |
|---|---|
| *G06K 9/00* | (2006.01) |
| *H04N 19/98* | (2014.01) |
| *H04N 19/184* | (2014.01) |
| *H04N 19/33* | (2014.01) |
| *H04N 19/30* | (2014.01) |
| *H04N 19/86* | (2014.01) |
| *H04N 19/80* | (2014.01) |

(52) U.S. Cl.
CPC ........... *H04N 19/98* (2014.11); *H04N 19/184* (2014.11); *H04N 19/30* (2014.11); *H04N 19/33* (2014.11); *H04N 19/80* (2014.11); *H04N 19/86* (2014.11)

(58) Field of Classification Search
None
See application file for complete search history.

(56) References Cited

U.S. PATENT DOCUMENTS

| | | | |
|---|---|---|---|
| 8,866,975 B1 | 10/2014 | Chen et al. | |
| 2012/0050474 A1* | 3/2012 | Segall | G06T 5/50 |
| | | | 348/43 |
| 2017/0116955 A1* | 4/2017 | Stauder | H04N 1/6066 |

FOREIGN PATENT DOCUMENTS

| | | | |
|---|---|---|---|
| EP | 2866450 A1 | 4/2015 | |
| EP | 3110128 | * 12/2016 | |
| WO | 2016069459 A1 | 5/2016 | |
| WO | WO-2016069459 A1 * | 5/2016 | ............. H04N 19/30 |

OTHER PUBLICATIONS

Search Report dated Mar. 27, 2017 on related United Kingdom application GB 1616719.9 filed Sep. 30, 2016.

* cited by examiner

*Primary Examiner* — Delomia L Gilliard
(74) *Attorney, Agent, or Firm* — EIP US LLP

(57) ABSTRACT

A method of processing an image is provided. The method includes receiving compressed image data comprising encoded image data representing the image. The method includes decoding the encoded image data to generate first decoded image data with a first bit precision. The method includes processing the first decoded image data to generate second decoded image data with a second bit precision higher than the first bit precision. The method includes applying a tone mapping operation to the second decoded image data to generate first tone mapped image data with the second bit precision. The method includes converting the first tone mapped image data to second tone mapped image data with the first bit precision. A computing device is also provided.

20 Claims, 4 Drawing Sheets

IMAGE PROCESSING

CROSS-REFERENCE TO RELATED APPLICATIONS

This application claims priority under 35 U.S.C. § 119(a) and 37 CFR § 1.55 to United Kingdom Application No. GB 1616719.9, filed Sep. 30, 2016. The entire contents of the above-referenced patent application are hereby incorporated by reference.

BACKGROUND

Field of the Disclosure

The present disclosure relates to a method and a computing device for processing an image.

Description of the Related Technology

High dynamic range (HDR), high precision image and video content is now widely available. For example, digital cameras providing 12- or 14-bit HDR images are available. While some devices, such as HDR televisions, have HDR-compatible displays, other devices, such as smartphones, typically have low dynamic range (LDR) 8-bit displays, sometimes referred to as SDR or standard dynamic range. The extra precision of HDR content is therefore currently not visible to users of devices without HDR-compatible displays, even if they attempt to view HDR content.

For example, images may be displayed on such devices in a JPEG (Joint Photographic Experts Group, ISO/IEC 10918) format, which does not provide HDR content. The JPEG committee is, however, in the process of developing a new coding standard called JPEG XT (ISO/IEC 18477). JPEG XT aims to provide both HDR image coding and backwards compatibility with standard JPEG compression.

Standard JPEGs typically use an 8-bit precision. It is anticipated that JPEG XT images will use a higher bit precision of, for example, between 9 and 16 bits. At present, the JPEG XT format is not widely used because the differences between JPEG and JPEG XT images cannot readily be seen on current LDR 8-bit displays.

It is desirable to enhance an image quality of an image for display on LDR displays as well as HDR displays, for example to take advantage of the availability of HDR image coding.

SUMMARY

According to a first aspect, a method of processing an image is provided. The method includes receiving compressed image data comprising encoded image data representing the image. The method includes decoding the encoded image data to generate first decoded image data with a first bit precision. The method includes processing the first decoded image data to generate second decoded image data with a second bit precision higher than the first bit precision. The method includes applying a tone mapping operation to the second decoded image data to generate first tone mapped image data with the second bit precision. The method includes converting the first tone mapped image data to second tone mapped image data with the first bit precision.

According to a second aspect, a computing device is provided. The computing device includes storage for storing compressed image data comprising encoded image data representing an image. The computing device includes at least one processor communicatively coupled to the storage. The computing device includes a bit precision enlargement module. The bit precision enlargement module includes decode the encoded image data to generate first decoded image data with a first bit precision. The bit precision enlargement module includes process the first encoded image data to generate second decoded image data with a second bit precision higher than the first bit precision. The computing device includes a tone mapping module configured to apply a tone mapping operation to the second decoded image data to generate first tone mapped image data with the second bit precision. The computing device includes a bit precision reduction module configured to convert the first tone mapped image data to second tone mapped image data with the first bit precision.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

Details of the method according to examples will become apparent from the following description, with reference to the FIGS. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method of processing an image, which may for example be implemented using a computing device. The image may be the entire or whole image or a portion, part or subset of a larger image. The image is for example an image from a web page accessed by a browser of the computing device, such as a browser of a smartphone; an image captured by an image capture device, such as a camera, of the computing device; or an image downloaded to or stored in storage of the computing device. The image may include any graphical or visual content, for example text, graphics, pictures, and/or photographs.

Figure 1:
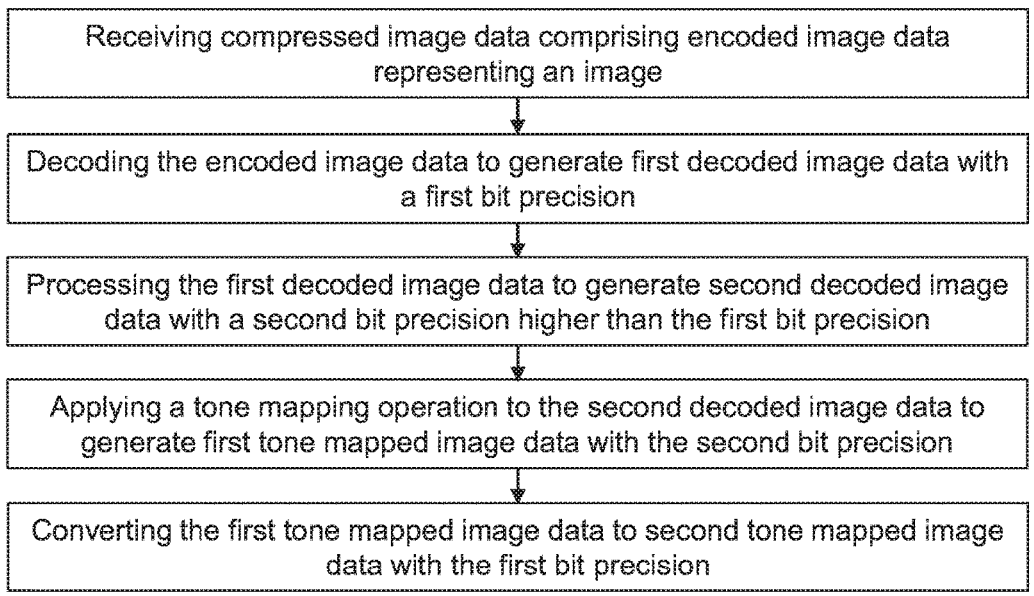
FIG. 1 is a flow diagram illustrating a method of processing an image according to examples.

FIG. 1 is a flow diagram illustrating the method of processing the image according to examples. The method includes receiving compressed image data comprising encoded image data representing an image. The encoded image data is decoded to generate first decoded image data with a first bit precision. For example, the encoded image data may be in the JPEG or JPEG XT file format and the decoder may be or include a standard JPEG or JPEG XT decoder, respectively.

The method further includes processing the first decoded image data to generate second decoded image data with a second bit precision higher than the first bit precision. The generation of the second decoded image data may include processing of solely the first decoded image data or processing of the first decoded image data and further data, as will be explained further below. A tone mapping operation is applied to the second decoded image data to generate first tone mapped image data with the second bit precision. As the skilled person will understand, tone mapping for example involves altering a relative brightness of different parts of the image represented by the decoded image data to enhance or amplify detail in the original image that would otherwise be less visible, while maintaining a natural look of the image to an observer. In this way, the quality of the image may be improved.

The method further includes converting the first tone mapped image data to second tone mapped image data with the first bit precision. This may therefore be considered to be or correspond to a bit precision reduction operation. The conversion may be used to reduce a number of bits of the first tone mapped image data to equal a maximum bit precision displayable by the display device, allowing the image represented by the second tone mapped image data to be displayed by the display device without having to further process the second tone mapped image data. A variety of methods may be used for the bit precision reduction operation, as will be explained further below.

With the method according to examples, the processing of the first decoded image data to generate the second decoded image data boosts or increases a bit precision of the data representing the image. This allows the tone mapping operation to be applied to the second decoded image data with a higher bit precision representation of the image than otherwise. For example, the second decoded image data may store increased information about the image due to the increased bit precision, allowing the image to be reproduced more accurately, for example after subsequent processing steps. This improves the outcome of the tone mapping operation, leading to greater enhancement in detail in the image, while maintaining its natural look, than would otherwise be achieved if the tone mapping operation was applied to a representation of the image with a lower bit depth. Moreover, by converting the first tone mapped image data to the second tone mapped image data with the first bit precision, the image represented by the second tone mapped image data can be displayed by display devices with the first bit precision, but with improved display quality.

To put the method into context, an example system with which the method according to examples in accordance with FIG. 1 may be used will be described with reference to FIG. 2 As the skilled person will appreciate, however, other systems or apparatus may be used with or to implement the method. FIG. 3 illustrates a sequence diagram showing an example of communications between the one or more databases, the server device, the computing device and the display device of FIG. 2. Further details of the method according to examples are given subsequently, especially with reference to FIGS. 4 and 5.

Figure 2:
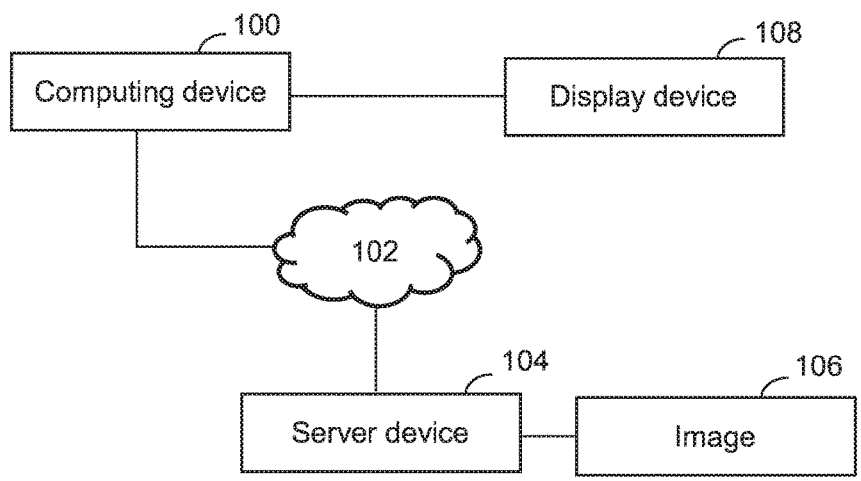
FIG. 2 is a schematic diagram showing an illustrative overview of an example system for use with a method of processing an image according to examples, such as the method of FIG. 1.
Figure 3:
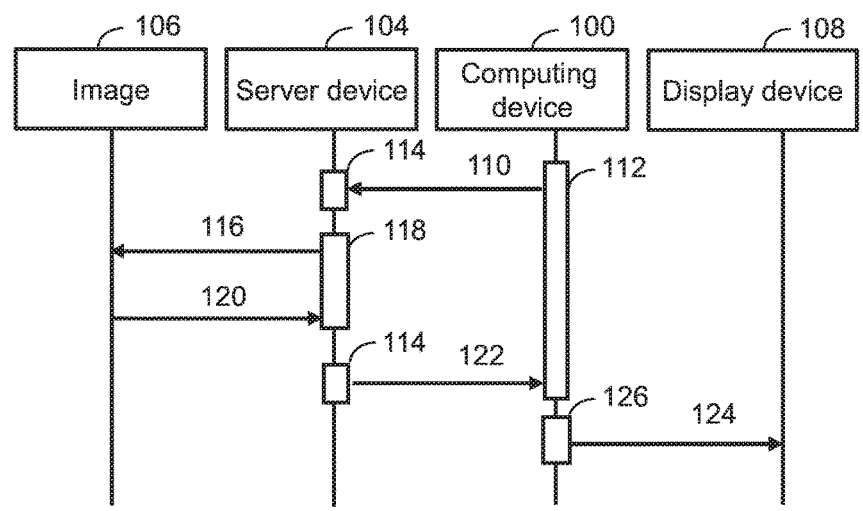
FIG. 3 is a sequence diagram showing an example of communications between the one or more databases, the server device, the computing device and the display device of FIG. 2.

FIG. 2 shows a computing device 100 communicatively coupled to a server device 104 over a network 102. An image 106 is stored on the server device 104. The computing device 100 is communicatively coupled to a display device 108. The network 102 may comprise a series of networks such as the Internet.

The computing device 100 may be or include, amongst others, a cell phone, i.e. a mobile phone, for example a smartphone, a tablet, laptop or personal computer, a personal digital assistant, as well as various other electronic devices such as a game console. The components of an example computing device 100 are described in detail below with reference to FIG. 6. The computing device 100 may have integrated or externally-coupled wired and/or wireless local area network (LAN) capabilities, e.g. which may be coupled via an additional Universal Serial Bus (USB) or proprietary device. For example, the computing device 100 may be couplable to a wired and/or wireless router that is in turn connected to a Digital Subscriber Line (DSL), cable or fiber connection to a local exchange. The local exchange may be coupled to the so-called Internet using one or more intermediate networks, such as a Public Switched Telephone Network (PSTN) or a cable provider's network system. Alternatively, wireless telecommunications systems such as those using the Universal Mobile Telecommunications System (UMTS) or any of the Long Term Evolution (LTE) standards may provide a communications medium for fixed or mobile computing devices. These latter network systems may in turn be connected to a series of one or more networks comprising servers, routers and other networking equipment that communicate using protocols such as Transmission Control Protocol (TCP) and Internet Protocol (IP). If the computing device 100 is a mobile device such as a smartphone, the computing device 100 may have an integrated telecommunications module for wirelessly communicating with a core network coupled to one or more TCP/IP networks; likewise, if the computing device 100 is a laptop or tablet computer it may have an externally-coupled telecommunications modem (a so-called "dongle", typically coupled via USB) for wireless communication with the core network and the wider Internet. The server device 104 may likewise have appropriate network communication components. The server device 104 may include an HTTP server that is arranged to receive requests over the network 102. In certain cases, one or more of the computing device 100 and the server device 104 may comprise virtual devices implemented on underlying physical computing hardware. The computing device 100 in examples may be considered to be a client device configured with access to the server device 104.

In an illustrative example of a possible use of the method according to examples, a user accesses a web page using a browser of the computing device 100. The web page is hosted on the server device 104 and includes various content including an image 106. The browser retrieves compressed image data including encoded image data representing the image 106 from the server device 104 via the network 102. For example, the server device 104 may be arranged to receive and handle HTTP or other network requests. The compressed image data may be in the JPEG format or the JPEG XT format, for example. The encoded image data may be all or part of the compressed image data. For example, a JPEG or JPEG XT file may include encoded image data representing an image as well as additional data, such as metadata for example relating to or encoding a date and time associated with the image, a description of the image or copyright information relating to the image. For example, where the compressed image data is in the form of a JPEG, the metadata may be stored in the Exchangeable Image File Format (EXIF). The EXIF data may be embedded within the input image file itself, for example within the JPEG file. Typically, EXIF data is stored in a header of the JPEG. For example, EXIF data may be stored in one of the utility Application Segments of the JPEG, generally the APP1 (segment marker 0xFFE1), although other segments may be used.

In the example of FIG. 2, the computing device 100 includes a bit precision enlargement module, a tone mapping module and a bit precision reduction module, which together can implement the method according to examples. These modules will be described in detail with reference to FIG. 4. The output of the bit precision reduction module is the second tone mapped image data with the first bit precision. An output image derived from the second tone mapped image data may be displayed by the display device 108 coupled to the computing device 100. The display device 108 may be internally coupled to the computing device, with the display device 108 forming part of the computing device 100 itself. For example, the display device 108 may be a display screen of a computing device 100 such as a smartphone; tablet, laptop or desktop computer; or personal digital assistant. Alternatively, the display device 108 may be an external device coupled to the computing device 100, for example a television screen or a computer monitor coupled to a laptop, desktop computer or game console via a High-Definition Multimedia Interface (HDMI) cable.

FIG. 3 is a sequence diagram showing an example set of communications between the storage of the server device storing the image 106, the server device 104, the computing device 100 and the display device 108 of FIG. 2.

In operation 110, a browser of the computing device 100 requests a web page including an image from the server device 104 via a network interface 112 of the computing device 100. The request is received by a network interface 114 of the server device 104. In operation 116 of the example communications of FIG. 3, a storage interface 118 of the server device 104 accesses the compressed image data comprising the encoded image data representing the image 106 of the web page from storage of or coupled to the server device 104. The web page, including the compressed image data, is transmitted from the storage to the storage interface 118 of the server device 104 in operation 120. The server device 104 then transmits the compressed image data from the network interface 114 of the server device 104 to the network interface 112 of the computing device 100 in block 122. Modules of the computing device, described further with reference to FIGS. 4 to 6, process the encoded image data of the compressed image data to generate the second tone mapped image data with the first bit precision. In block 124, output data derived from the second tone mapped image data is transferred by a display device interface 126 of the computing device 100 to a display device 108 to display an image based on the second tone mapped image data, as well as other content of the web page, to the user.

In other examples, it isn't necessary to transmit the complete compressed image data to the computing device 100. For example, in some cases solely the encoded image data or part of the encoded image data of the compressed image data is transferred to the computing device 100.

Figure 4:
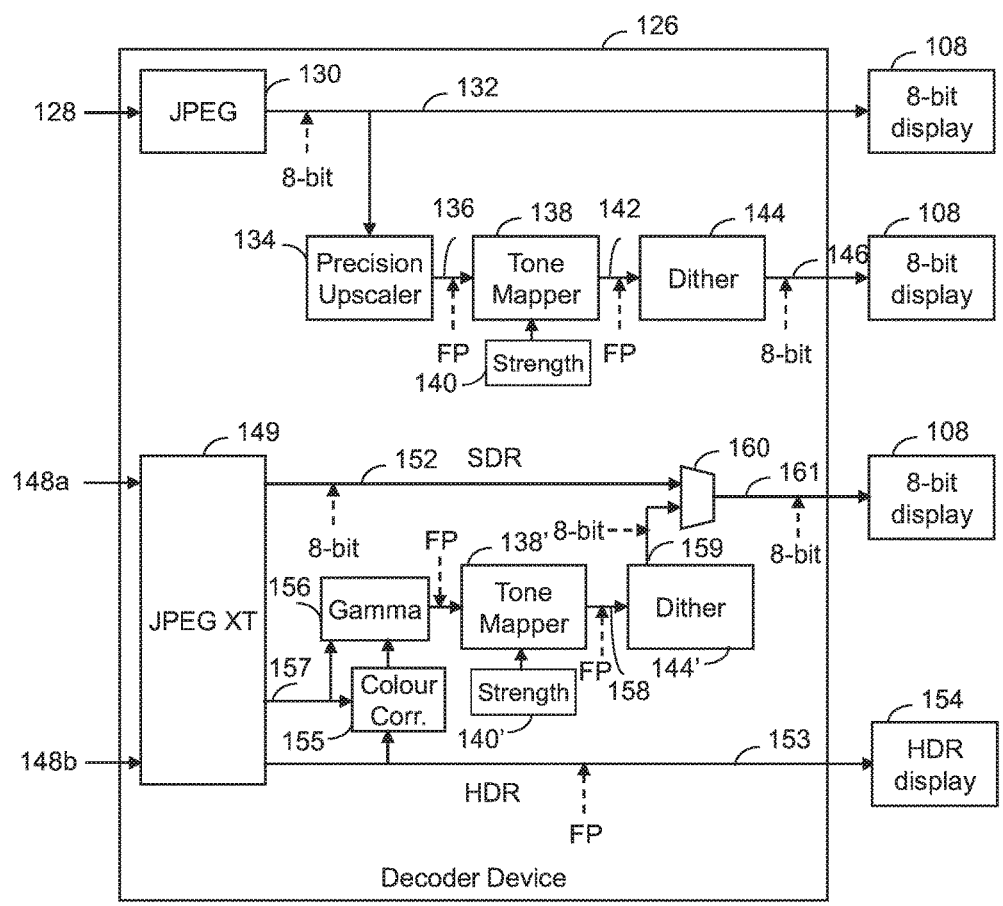
FIG. 4 is a schematic diagram showing an example of internal components of a decoder for carrying out a method of processing an image according to examples.

As noted above, the compressed image data may be in the JPEG or JPEG XT file format. FIG. 4 shows schematically an example of internal components of a decoder 126 for carrying out the method of processing an image according to examples. The decoder 126 of FIG. 4 is suitable for decoding both 8-bit JPEG and more than 8-bit JPEG XT files, although other decoders may be used to carry out the method of examples that are solely arranged to decode one file type. Decoding of compressed image data in the 8-bit JPEG format will first be described, before decoding of compressed image data in the more than 8-bit JPEG XT format is described.

FIG. 4 shows schematically an example of the decoder 126 receiving JPEG compressed image data 128 in the 8-bit JPEG format. The JPEG compressed image data includes JPEG encoded image data representing the image. The JPEG encoded image data in this example has been encoded using a standard JPEG encoder, as the skilled person will appreciate. The decoder 126 includes a standard JPEG decoder 130, which receives and decodes the JPEG encoded image data to generate JPEG first decoded image data 132 with the first bit precision. A bit precision in examples is a number of bits associated with a piece of data. For example, a bit precision may also be referred to as a bit depth and may be the number of bits used to indicate an intensity value or a color or intensity value of a color channel of a pixel of an image. For example, for 8-bit JPEG first decoded image data, each color channel may be represented by an intensity value of between 0 and 255, giving 256 possible intensity values per color channel. There may be for example 3 color channels, for example a red, green or blue channel, although different numbers or types of color channel are also possible.

In this example, the first bit precision is 8-bit, which is the standard bit precision for JPEG files of the JPEG ISO/IEC 10918 standard, although other bit precisions are possible for the first bit precision, for example for other data types. For example, data with the first bit precision may be considered to be LDR or SDR data. The JPEG first decoded image data 132 may be transferred for display on the display device 108 without further processing, to provide additional display flexibility. However, without further processing, the image quality will be limited to the image quality associated with a standard decoded JPEG file.

Thus, in the example of FIG. 4, the decoder 126 not only decodes the JPEG encoded image data but also provides further image processing to enhance an image quality of the image represented by the JPEG encoded image data. The decoder 126 in the example of FIG. 4 includes a "compression-noise" reduction module, which in this example is a precision upscaler 134. The compression-noise reduction module in this example receives the JPEG first decoded image data 132 and applies one or more compression-noise reduction filters to the JPEG first decoded image data 132. In examples, application of the one or more compression-noise reduction filters reduces compression-noise in the JPEG first decoded image data 132. Without reduction of compression-noise, there may be visible artifacts in the final image. Compression-noise typically occurs with a lossy encoding of original image data, such as JPEG or JPEG XT encoding. Lossy encoding generally involves an approximation of the original image data, with some reduction in image fidelity. For example, some original image information may be lost. It may not be possible to recover this lost information, which can reduce the image quality compared with the image quality of the original image. The compressed image data may, however, have a smaller file size than the original, uncompressed, image data representing the image, reducing the space requirements for storage of the compressed image data. Due to the approximation process involved in the lossy encoding algorithm, the representation of the image associated with decoded image data may suffer from compression artifacts such as compression-noise that are visible to an observer. For example, there may be noise, such as pixels with an incorrect (for example noticeably darker or lighter) intensity, around features of the image such as edges or regions corresponding to a transition from a light to a dark image region. There may also or instead be visible "blocks" of pixels with the same intensity around such image features, rather than pixels with smoothly varying intensities. Compression artifacts such as these are typically caused by the quantization step of the JPEG algorithm, which involves rounding of various components to integer values, thereby reducing the information associated with the quantized, encoded image data. The visibility of such compression artifacts may depend on the extent or amount of compression applied to the original image data to obtain the compressed image data.

Various different compression-noise reduction filters may be applied to the JPEG first decoded image data 132 to generate JPEG second decoded image data 136. For example, the JPEG first decoded image data 132 may be in the form of a matrix or other multi-dimensional data structure. The JPEG first decoded image data 132 may be convolved with a suitable "compression-noise" reduction filter, which is typically also in the form of a matrix or multi-dimensional data structure. The compression-noise reduction filter in examples smoothes out compression artifacts in the JPEG first decoded image data 132 while increasing the bit precision of the data from the first bit precision to the second bit precision, for example by converting the data from LDR or SDR data to HDR data. The compression-noise reduction filter may be used to reduce compression artifacts such as blockiness, e.g. visible blocks, or ringing, e.g. visible rings, in images. For example, a compression-noise reduction filter may be or include an edge detection filter such as a Canny edge detector, which may be applied to the JPEG first decoded image data 132 to identify points or regions in the image at which the image brightness or pixel intensity changes rapidly or sharply. Such points or regions typically correspond with edges in the image, for example transitions between different surfaces or components within the image. Depending on the proximity to the identified edge regions, the pixel intensity values can be adjusted, for example smoothed, to reduce compression-noise in the image represented by the JPEG second decoded image data 136. For example, pixel intensities may be averaged over a set of adjacent or nearby pixels for pixels in regions that are identified as being within a pre-determined proximity to a detected edge. In examples, the pixel intensity values may be altered by applying a further compression-noise reduction filter to the JPEG first decoded image data 132, for example in regions of the image represented by the JPEG first decoded image data 132 that are identified as corresponding to regions that are considered likely to suffer from compression artifacts. The application of the one or more compression-noise reduction filters in examples increases the bit precision of the data representing the image to the second bit precision, which is higher than the first bit precision of the first decoded image data. For example, data with the second bit precision may be HDR data, for example data with a bit precision higher than 8-bit. The one or more compression-noise reduction filters may be applied using a graphics processing unit of the computing device 100 (not illustrated) in examples. This can allow parallel processing or computation of convolutions of the one or more compression-noise reduction filters with various groups or regions of pixels of an image. This can improve the speed of performing the compression-noise reduction.

In examples, the application of the one or more compression-noise reduction filters includes applying one or more smoothing filters to reduce banding noise in the first decoded image data. Banding noise is a type of compression-noise that, as described above, may be caused by the quantization step of the JPEG or JPEG XT encoding algorithm. For example, during this quantization process, there may be a few image regions in an image in which pixel intensities change by a relatively small amount. For example, in an image of the sky with a lighter region and a darker region, the lighter region and the darker region may each show relatively little change in pixel intensity and/or color. In this illustrative example, the pixels corresponding to the lighter region in the image may be compressed to a first pixel intensity and color value, and the pixels corresponding to the darker region in the image may be compressed to a second pixel intensity and color value. This compression is typically not visible when no further processing is applied to the image. However, when a tone mapping operation is applied to the image, as in the method according to examples, the tone mapping operation may increase the difference between the lighter region and the darker region, leading to a visible band or contour in which all the pixels of the lighter region have the same pixel intensity and color value, which contrasts strongly with a neighboring band or contour of pixels of the darker region. By applying the one or more smoothing filters such as a low-pass filter with a suitable kernel, which for example governs how a pixel's filtered intensity value depends on the intensity value of neighboring pixels, the banding noise can be reduced. For example, the one or smoothing filters may reduce a sharpness in contrast between image regions of different intensities or colors, for example by blurring, spreading or gradually adjusting the pixel intensity in a transition region between the different image regions. For example, a simple low-pass filter can be used to calculate the average intensity of a pixel and the 8 immediate neighbors of the pixel, and replacing the original intensity value of the pixel with this calculated average intensity value. This can be used to increase the bit precision to the second bit precision, as for example the pixel intensity may be represented by a larger number of bits (for example, a larger or more finely quantized series of possible intensity values for the pixel intensity).

The extent to which the compression-noise in the image is reduced by the one or more compression-noise reduction filters may depend on a quality factor. For example, the quality factor may be received as an input to the one or more compression-noise reduction filters, for example to the precision upscaler 134 in the example of FIG. 4. The quality factor may be selected by a user depending on a desired visual impression for the image or the quality factor may depend on user-independent characteristics such as the content of the image or settings associated with the image, for example provided by the content creator.

In examples, the JPEG decoder 130 and the compression-noise reduction module are together considered to form a bit precision enlargement module. In other examples, though, the JPEG decoder and the compression-noise reduction module may be implemented separately or in distinct modules.

The output of the compression-noise reduction module is the JPEG second decoded image data 136 with the second bit precision. The second bit precision need not be a fixed or constant bit precision. For example, in FIG. 4, the JPEG second decoded image data 136 may be floating point data, for example stored in a floating-point representation with a higher available bit precision than the first bit precision. In other examples, the second bit precision may be fixed or constant, for example a fixed value of any one of 9 to 16. The JPEG second decoded image data 136 is input to a tone mapping module 138 which is configured to apply the tone mapping operation to the second decoded image data 136 to generate the first tone mapped image data 142 with the second bit precision.

As noted above, the tone mapping operation in examples aims to enhance detail or contrast in the image, while still ensuring the image appears relatively "natural" to an observer. To do this, the tone mapping may be asymmetric in the brightness domain, such that a greater amount of tone mapping is applied to dark regions of the image than relatively bright regions, for example by altering an intensity value of relatively dark portions of the image to a greater extent than relatively bright portions. This mimics the behavior of the human eye, which has a relatively high dynamic range, and which is capable of seeing detail in even relatively dark regions of an image. The tone mapping operation may therefore be spatially-variant, for example spatially non-uniform, with a greater amount of tone mapping applied to certain spatial regions of the image compared with other spatial regions. The tone mapping may be continuous and smoothly-varying in both spatial and luminance dimensions. The intensity range of pixels corresponding with detail to preserve in the image in dark and/or light areas may therefore be increased and the intensity range of other areas of the image may be decreased. The tone mapping may therefore involve adjusting the dynamic range of the image, which in examples is the ratio between intensities of the brightest and darkest parts of the image. Adjusting the dynamic range in this way typically enhances detail in dark and/or light areas of the image and reduces detail in mid-tone areas so as to render visible detail that would otherwise be lost in bright or shaded areas of the image while still maintaining a natural look of the image to the observer. Various different tone mapping algorithms may be used for the tone mapping operation. For example, a suitable algorithm is the Orthogonal Retina-Morphic Image Transform (ORMIT) algorithm.

The dynamic range may be compressed or expanded by the tone mapping operation. For example, the tone mapping operation may apply a dynamic range compression to enhance detail in dark regions of the image. Dynamic range compression can also or alternatively be used to reduce the dynamic range of the image to match or be closer to a dynamic range displayable by a display device coupled to the computing device, for example. Images captured using a camera can have a high dynamic range of for example up to around 4000:1. In contrast, the dynamic range of typical display devices may be much lower than this, for example around 50:1. Dynamic range compression can therefore be applied to reduce a dynamic range of input image data, such as the second decoded image data, representing a high dynamic range image to match a lower dynamic range of a display device for displaying the image.

Conversely, dynamic range expansion can be used to increase a dynamic range of the image, for example in cases where the dynamic range displayable by the display device is larger than a dynamic range of the second decoded image data.

An amount of tone mapping applied to the tone mapping operation may depend on a strength parameter 140, which in examples is input to the tone mapping module 138. The amount of tone mapping may correspond with the extent or magnitude of alteration of the intensity value of pixels in the image by the tone mapping operation, for example to enhance the image detail as explained above. The strength parameter 140 may depend on various parameters such as a user preference, a display property of a display device configured to display an output image based on the second tone mapped image data; an ambient light level; or an application property of an application for use in displaying the output image, such as a browser. Alternatively, the strength parameter 140 may be a default value. Where the tone mapping operation involves the use of the ORMIT algorithm, the strength parameter 140 may correspond with the ORMIT alpha parameter, $\alpha$.

In further examples, the strength parameter 140 may correspond with an alpha-blending parameter for alpha-blending of a first version of the image represented by the second decoded image data with a first, for example zero, tone mapping applied and a second version of the image represented by the second decoded image data with a second, different, for example non-zero, tone mapping applied. The second tone mapping in examples is a maximal tone mapping. A relative contribution of the first and second versions of the image to an output image may depend on the alpha-blending parameter in such examples. As the skilled person will appreciate, the alpha-blending procedure may be considered to be an overlaying or combining of the two versions of the same image. In such cases, the tone mapping operation may be considered to include or correspond with an alpha-blending operation.

In the example of FIG. 4, the tone mapping operation is performed by the decoder 126, which is capable of decoding compressed images encoded at the first bit precision and of decoding compressed images encoded at the second bit precision. In this example, the decoder 126 comprises the bit precision enlargement module (which in this example includes the JPEG decoder 130 and the precision upscaler 134), the tone mapping module 138 and the bit precision reduction module (to be described). In other examples, some or all of these modules may not form part of the decoder.

JPEG first tone mapped image data 142 output from the tone mapping module 138 is converted to JPEG second tone mapped image data 146 with the first bit precision using a bit precision reduction module, which in this case is a dither module 144. In examples, the bit precision reduction module reduces a bit precision of the JPEG first tone mapped image data 142 to generate the JPEG second tone mapped image data 146 while substantially maintaining an image quality of the image represented by the JPEG second tone mapped image data 146. For example, the bit precision reduction module may be used to approximate the image quality of the image in the JPEG second tone mapped image data 146, while also achieving the desired reduction in bit precision.

In examples, the second bit precision is represented by a first series of bits providing the first bit precision and an additional one or more bits providing additional bit precision to form the second bit precision. In such cases, the method may include, when converting the first tone mapped image data to the second tone mapped image data, improving the display quality of the image when represented by the first series of bits by deriving information from the additional one or more bits for pixels in at least part of the image and using the information to alter the first series of bits for pixels in the at least part of the image. The additional one or more bits for the pixels in the at least part of the image are discarded. In these cases, the additional one or more bits are used to manipulate or modify the first series of bits, but are not themselves part of the second tone mapped image data, which has the first bit precision.

In such examples, the improving the display quality of the image represented by the first series of bits may include applying a dithering operation to the first tone mapped image data. FIG. 4 shows such an example. The dithering operation may be used to approximate pixel intensities or other pixel values in the first tone mapped image data which can be represented with the second bit precision but not with the first bit precision in order to generate second tone mapped image data which still provides a relatively faithful and accurate representation of the image represented by the first tone mapped image data. For example, where a pixel intensity of a pixel region in the first tone mapped image data is at an intensity level not available with the second bit precision, the pixel intensity can be approximated with second tone mapped image data with some of the pixels in the pixel region at a lower intensity level and other pixels in the pixel region at a higher intensity level. The dithering operation is typically a spatial dithering operation, to avoid having to rapidly refresh the display as would be needed for a temporal dither. Various algorithms may be used by the dither module 144 to apply the dithering operation, as the skilled person will appreciate. For example, an error diffusion dither operation may be applied by the dither module 144. Error diffusion dithering can be used to reduce a bit precision of data. As a simple example, error diffusion dithering can be used to reduce an image to a binary image, in which each pixel is either black or white. For example, a halftoning process may be applied to pixels by assessing whether the intensity value of each pixel is above or below a threshold such as a mid-grey value for a black and white image and setting the pixel intensity to black if below the threshold and to white if above the threshold. The pixel intensity therefore differs from its original value. This difference may be considered to be an error, which can be added to one or more pixels in the image that haven't yet been compared to the threshold. This process can be repeated for all of the pixels in the image to generate the halftoned or dithered image. As will be appreciated, in other examples, error diffusion dither may be applied to produce output images with more than two intensity levels per pixel, for example to produce the second tone mapping image data with the first bit precision.

The first bit precision is for example equal to a maximum bit precision displayable by a display device configured to display an output image based on the second tone mapped image data. For example, for typical LDR display devices, the first bit precision may be 8-bit.

The second tone mapped image data 146 is transferred for display by the display device 108 coupled to the computing device 100. Further processing may be applied to the second tone mapped image data 146 before display, either at the decoder 126 (not shown) or outside the decoder 126, for example in another module of the computing device 100. For example, the second tone mapped image data 146 may be composited with further display data representing at least one further display element to generate an output image for display by the display device 100. As the skilled person will appreciate, the compositing may be performed by a compositing window manager, which is also referred to as a compositor. A compositor in examples draws different applications in different windows and overlays the different windows appropriately, with varying degrees of transparency, in order to display a desired output image on the display device 100.

By using the decoder to both decode the encoded image data and to generate the second tone mapped image with the first bit precision, greater flexibility is provided for processing of the image. For example, the image may be processed by the decoder and then further processed by the display driving system, e.g. by the display controller. For example, further tone mapping, or dynamic range compression or expansion, may be applied to the data for display by the display device (including the image, and the remainder of the screen for display) by the display driving system, to further improve the image quality.

As noted above, the example decoder 126 of FIG. 4 can also be used to decode JPEG XT compressed image data 148 in a more than 8-bit JPEG XT format, as will now be described.

Figure 5:
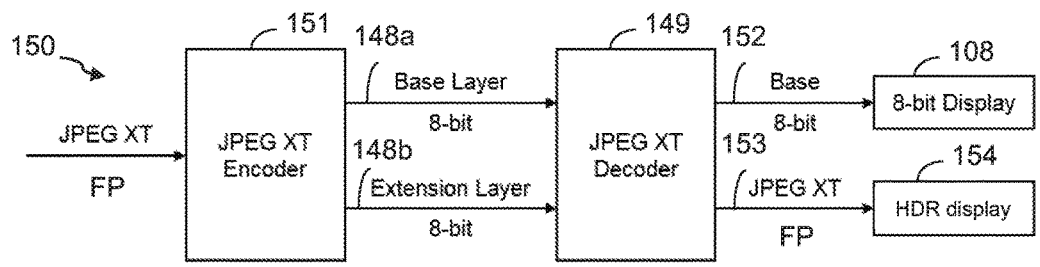
FIG. 5 is a schematic diagram showing an example JPEG XT codec.

The JPEG XT compressed image data 148 is received by a JPEG XT decoder 149 of the decoder 126 of FIG. 4. The JPEG XT compressed image data 148 includes base image layer data 148a and additional image layer data 148b. The JPEG XT decoder 149 of FIG. 4 is illustrated schematically in FIG. 5, which shows an example JPEG XT codec 150 (coder-decoder). The JPEG XT codec 150 receives input JPEG XT data representing the image. In this example, the JPEG XT data has a floating-point bit precision of more than 8 bits, although other bit precisions are possible in other examples, for example fixed or static bit precisions of more than 8 bits. The input JPEG XT data is encoded using a JPEG XT encoder 151, which encodes the data into a base image layer containing the base image layer data 148a and an additional image layer containing the additional image layer data 148b. The base image layer data 148a may be LDR or SDR data accessible to legacy implementations so that the JPEG XT image can be decoded using a standard JPEG decoder, which can decode the LDR or SDR data and ignore the additional image layer data. The additional image layer data 148b in examples includes residual image data and transformation information for reconstructing an HDR image, for example an image with a higher dynamic range than the image represented by the base image layer data 148a. The base image layer data 148a may therefore be considered to represent a first dynamic range representation of the image. A second dynamic range representation of the image, the second dynamic range being larger than the first dynamic range, may be generated using the additional image layer data 148b. Both the base image layer data 148a and the additional image layer data 148b may have the same bit precision, for example 8-bit. FIG. 5 illustrates an example in which both the base image layer data 148a and the additional image layer data 148b are 8-bit, although in other examples, the base image layer data 148a and the additional image layer data 148b may have a different bit precision from each other and/or a different bit precision than 8-bit.

In the example of FIGS. 4 and 5, the base image layer data 148a and the additional image layer data 148b are input to the JPEG XT decoder 149. The JPEG XT decoder 149 of FIGS. 4 and 5 decodes the base image layer data 148a to generate decoded base image layer data 152. In this example, the base image layer data 148a may be considered to correspond with encoded image data representing the image and the decoded base image layer data 152 may be considered to correspond with first decoded image data with a first bit precision, which in this example is 8-bit, although other bit precisions are possible. The JPEG XT decoder 149 also decodes the additional image layer data 148b to generate decoded additional image layer data (not illustrated). In this example the decoded additional image layer data has the second bit precision, although in other examples the decoded additional image layer data may have a bit precision different from, for example larger or smaller than the second bit precision. Typically, however, the decoded additional image layer data has a bit precision larger than the first bit precision. The decoded base image layer data 152 can then be manipulated based on the decoded additional image layer data to generate the JPEG XT second decoded image data 153 with the second bit precision. The decoded additional image layer data can for example be used to apply various transformations to the decoded base image layer data 152 to generate the JPEG XT second decoded image data 153, as the skilled person will appreciate. In examples such as this, the processing the first decoded image data to generate the second decoded image data may include applying the decoded additional image layer data to the decoded base image layer data 152 to generate the second decoded image data 153. The second decoded image data 153 may correspond with the second dynamic range representation of the image.

The second dynamic range representation of the image may have a higher bit depth than 8-bit, e.g. floating point with a bit precision higher than 8-bits or in a bit range of 9 to 16 bits, for example for display on an HDR display device 164, for example a display device capable of displaying higher bit depth images. For example, the second decoded image data 153 in the example of FIGS. 4 and 5 is HDR data. A JPEG XT decoder can also decode standard JPEG images as well as JPEG XT images by using solely the base image layer data, for example for display on an LDR or SDR display, such as the display device 108 described above with reference to FIG. 2, with an 8-bit display capability. For example, the base image layer data may be decoded and processed similarly to the processing of the JPEG first decoded image data to improve the image quality. Thus, for JPEG XT images, the decoder in examples provides two options for producing an output image for display an on LDR display: the output image can be obtained by processing of the base image layer data alone or by processing of the base image layer data and the additional image layer data.

In the example of FIGS. 4 and 5, prior to display of the JPEG XT image on the HDR display device 154, further processing (not illustrated in FIG. 5, but shown in FIG. 4), is applied to the JPEG XT second decoded image data 153. This processing is similar to the processing that the decoder 126 is arranged to apply after JPEG decoding of the JPEG encoded image data, however it is not required to apply the one or more compression-noise reduction filters to generate the JPEG XT second decoded image data 153 with the second bit precision, as the JPEG XT second decoded image data 153 received from the JPEG XT decoder 149 is already at the second bit precision.

Nevertheless, in some examples, one or more compression-noise reduction filters, such as those described above with reference to the processing of JPEG images, may be applied to the JPEG XT second decoded image data 153. Such compression-noise reduction filters may be used to reduce compression artifacts that may be present in the image represented by the JPEG XT second decoded image data 153. In these examples, the application of the one or more compression-noise reduction filters may increase the bit precision or may not alter the bit precision of the JPEG XT second decoded image data 153. For example, it may be beneficial to apply one or more compression-noise reduction filters for images in which certain image regions, such as bright regions, are effectively represented with a relatively low bit precision such as 8-bit. This may be the case where there is non-negligible noise in these image regions. For example, in some images, the noise may be from a few bits to 8 bits. In these examples, as the dynamic range may be considered to correspond to the ratio between the brightest part of the image and the noise, for example the standard deviation, of the darkest part of the image, the effective dynamic range in certain image regions may therefore be noticeably reduced due to the amount of noise in these regions. In such examples, one or more compression-noise reduction filters can be applied to the image for example to improve the precision of these image regions.

In further examples, the one or more compression-noise reduction filters may be applied by the JPEG XT decoder itself such that the outputs of the JPEG XT decoder, e.g. the decoded base image layer data 152 and the JPEG XT second decoded image data 153, may be output with the compression-noise reduction already applied.

In this case, the JPEG XT second decoded image data 153 is input to a color correction module 155 and then, after color correction by the color correction module 155, to a gamma correction module 156. The color correction module 155 and the gamma correction module 156 receive data 157, in this example metadata, from the JPEG XT decoder 149, which governs the extent of color correction and gamma correction applied by the color correction module 155 and the gamma correction module 156 respectively. In other examples, however, the color correction module 155 and/or the gamma correction module 156 may not receive data from the JPEG XT decoder 149. In these examples, the extent of correction applied by the color correction module 155 and the gamma correction module 156 may be pre-set or pre-determined. The color correction module 155 may be used to modify or alter a color of the image, for example to widen a color gamut of the image e.g. to match or correspond with a wide color gamut of a display device for displaying the image. The gamma correction module 156 may be used to apply a gamma correction operation to the image. Gamma correction is typically a non-linear operation that may be defined using the following power-law expression:

$$V_{out} = AV_{in}^{\gamma} \tag{Eq. 1}$$

where $V_{out}$ is an output value, A is a constant, $V_{in}$ is an input value and $\gamma$ is a gamma value. The input and output values are for example luminance or tristimulus values of pixels of the image. Gamma correction can be used for example to represent an image so that an adequate number of bits are allocated to image features that can be distinguished by the human eye, without allocating too many bits to represent image features that the human eye is unable to perceive. For example, gamma correction may be used to provide a representation of the image with a uniform error across the brightness range of the image. This can be used to reduce the appearance of compression artifacts in the image. In further examples, though, no color correction and/or gamma correction may be applied to the JPEG XT second decoded image data 153. For example, the color correction module 155 and the gamma correction module 156 may be absent from the decoder.

After color correction and gamma correction the JPEG XT second decoded image data 153, which in this example has a floating-point bit precision of larger than 8 bits at this stage in the process, is provided to a tone mapping module 138', which is similar to the tone mapping module 138 described for tone mapping of JPEG data, and which applies an amount of tone mapping based on a strength parameter 140' similar to the strength parameter 140 described above for tone mapping of JPEG data. JPEG XT first tone mapped image data 158 with the second bit precision is generated by the tone mapping module 138', and is input to the dither module 144', which is similar to the dither module 144 described above for dithering of JPEG data. The dither module 144' converts the JPEG XT first tone mapped image data 158 to JPEG XT second tone mapped image data 159 with the first bit precision.

In the example of FIG. 4, the SDR data, which corresponds to the decoded base image layer data 152 and the JPEG XT second tone mapping image data 159 are received as inputs to a decision module 160. The decision module 160 in this example receives an input that indicates whether the standard SDR data is to be displayed on the display device 108 or whether the JPEG XT second tone mapping image data 159 is to be displayed on the display device 108. In this way, the input to the decision module 160 can be used to determine whether the image is to be displayed after application of the method of image processing (for example, with tone mapping and the other processes described herein) or whether a standard image without this image processing is to be displayed. The output 161 of the decision module 160 is displayed by the display device 108. In other examples, though, the decision module 160 may be absent, in which case the JPEG XT second tone mapped image data 159 may be transferred to the display device 108 for display and the decoded base image layer data 152 may not be displayed.

In the example of FIG. 4, the HDR data (corresponding to the JPEG XT second decoded image data 153) is shown as being displayed on an HDR display 154. However, in other examples, the JPEG XT second decoded image data 153 may not be displayed but may instead be discarded or stored for further processing of the image data if required.

The JPEG XT decoder of FIG. 4 therefore provides flexibility for displaying of images as well as backwards compatibility if required. For example, this JPEG XT decoder allows standard JPEG images (corresponding to the decoded base layer image data 153) to be displayed on SDR display devices 108, tone mapped images (corresponding to the JPEG XT second tone mapped image data 159) to be displayed on SDR display devices 108 and HDR images (corresponding to the JPEG XT second decoded image data 153) to be displayed on HDR display devices 154. For example, each of these options can be chosen as desired, for example depending on the display device available for display of the image, the nature or content of the image to be processed or a user preference.

An overview of examples of internal components for the computing device 100 of FIG. 2, which for example may include the decoder 126 of FIG. 4, is provided below with reference to FIG. 6.

Figure 6:
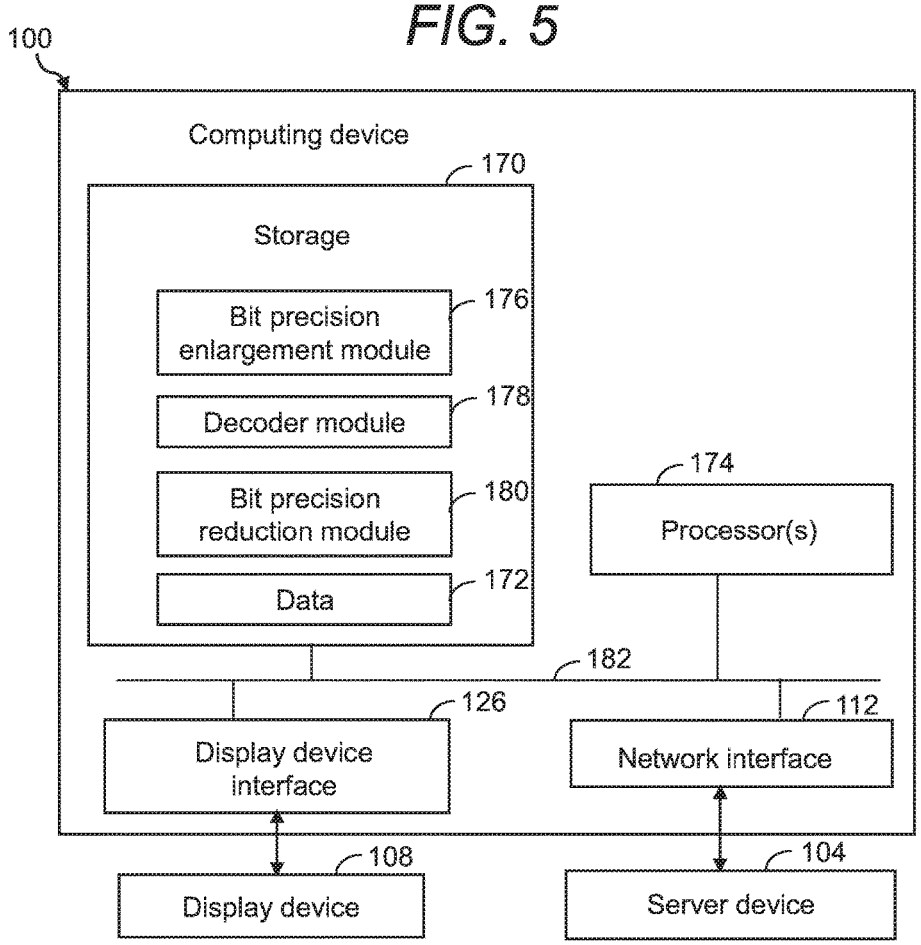
FIG. 6 is a schematic diagram showing an example of internal components of a computing device.

The computing device 100 of FIG. 6 comprises a network interface 112 to retrieve compressed image data including encoded image data representing the image from the server device 104. The network interface 112 of the computing device 100 may comprise software and/or hardware components, such as a virtual network interface, an Ethernet port, a software driver and/or communications stack interacting with network hardware.

Storage 170 of the computing device 100 in the example of FIG. 6 stores data 172 received at the network interface 112. The data 172 in this example includes the compressed image data and the encoded image data representing the image. The storage 170 may include at least one of volatile memory, such as a Random Access Memory (RAM) and non-volatile memory, such as Read Only Memory (ROM) or a solid-state drive (SSD) such as Flash memory. The storage 170 in examples may comprise further storage devices, for example magnetic, optical or tape media, compact disc (CD), digital versatile disc (DVD) or other data storage media. The storage 170 may be removable or non-removable from the computing device 100.

At least one processor 174 is communicatively coupled to the storage 170 in the computing device 100 of FIG. 6. The at least one processor 174 in the example of FIG. 6 may be a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The at least one processor 174 may also be or include at least one graphics processing unit (GPU) such as an NVIDIA® GeForce® GTX 980, available from NVIDIA®, 2701 San Tomas Expressway, Santa Clara, Calif. 95050, USA, although other processors are possible. For example, in one case the computing device may comprise a thin terminal with graphics processing capabilities; in other cases the computing device may comprise a computing device comprising at least one central processing unit (CPU) and at least one graphics processing unit.

The storage 170 in the example of FIG. 6 includes computer program code configured to, when processed by the at least one processor 174, implement a bit precision enlargement module 176, a decoder module 178 and a bit precision reduction module 180 such as those described above with reference to FIG. 4. This computer program code may be stored in an accessible non-transitory computer-readable medium and loaded into memory, for example the storage 170, to implement the bit precision enlargement module 176, the decoder module 178 and the bit precision reduction module 180 respectively.

The components of the computing device 100 in the example of FIG. 6 are interconnected using a systems bus 182. This allows data to be transferred between the various components. For example, the encoded image data received from the server device 104 via the network interface 112 can be transmitted via the systems bus 182 from the storage 170 to a display device interface 126 for transfer to the display device 108 for display. The display device interface 126 may include a display port and/or an internal electronics interface, e.g. where the display device 108 is part of the computing device 100 such as a display screen of a smart phone. Therefore, when instructed by the at least one processor 174 via the display device interface 126, the display device 108 will display an image based on the second tone mapped image data.

The above examples are to be understood as illustrative examples. Further examples are envisaged. For example, the examples given above relate to use of images in the JPEG or JPEG XT file formats. However, it is to be appreciated that the method of image processing and the systems and devices described above may be applied to or used with images stored in various other file formats, such as the JPEG 2000 file format (ISO/IEC 15444). For example, the compressed image data may be any type of compressed image data, which may be a lossless or lossy encoding of original image data.

In the above examples, the image is received from a server device. However, in other examples, the image may be stored on storage of the computing device or the functions of the server device and the computing device in FIGS. 2 and 3 may be combined in one device such as a smartphone. For example, the image may have been captured by an image capture device such as a camera of or coupled to the computing device or may have been downloaded or transferred to the computing device from other storage than storage of a server device.

The decoder may be implemented on a server device rather than a computing device. For example, the server device may include components similar to the example computing device 100 of FIG. 6 such as storage and at least one processor.

The examples described above use software to implement the method according to examples. However, in other examples, the method may be implemented using solely hardware or using a combination of hardware and software. For example, the decoder 126 of FIG. 4, including one or more of the bit precision enlargement module, the tone mapping module and the bit reduction precision module, for example, may be implemented in hardware.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

Further examples are described in accordance with the following numbered clauses:

Clause 1. A method of processing an image comprising: receiving compressed image data comprising encoded image data representing the image; decoding the encoded image data to generate first decoded image data with a first bit precision; processing the first decoded image data to generate second decoded image data with a second bit precision higher than the first bit precision; applying a tone mapping operation to the second decoded image data to generate first tone mapped image data with the second bit precision; and converting the first tone mapped image data to second tone mapped image data with the first bit precision.

Clause 2. The method according to clause 1, wherein the second bit precision is represented by a first series of bits providing the first bit precision and an additional one or more bits providing additional bit precision to form the second bit precision and wherein the method comprises, when converting the first tone mapped image data to the second tone mapped image data: improving the display quality of the image when represented by the first series of bits by deriving information from the additional one or more bits for pixels in at least part of the image and using the information to alter the first series of bits for pixels in the at least part of the image; and discarding the additional one or more bits for the pixels in the at least part of the image.

Clause 3. The method according to clause 2, wherein the improving the display quality of the image represented by the first series of bits comprises applying a dithering operation to the first tone mapped image data.

Clause 4. The method according to any one of clauses 1 to 3, wherein the first bit precision is equal to a maximum bit precision displayable by a display device configured to display an output image based on the second tone mapped image data.

Clause 5. The method according to any one of clauses 1 to 4, wherein the tone mapping operation is performed by a decoder capable of decoding compressed images encoded at the first bit precision and of decoding compressed images encoded at the second bit precision.

Clause 6. The method according to any one of clauses 1 to 5, wherein the tone mapping operation reduces a dynamic range of the second decoded image data.

Clause 7. The method according to any one of clauses 1 to 6, wherein the applying the tone mapping operation comprises applying a spatially-variant tone mapping to the second decoded image data.

Clause 8. The method according to any one of clauses 1 to 7, wherein the processing the first decoded image data comprises applying one or more compression-noise reduction filters to the first decoded image data.

Clause 9. The method according to clause 8, comprising applying one or more smoothing filters to reduce banding noise in the first decoded image data.

Clause 10. The method according to clause 8 or clause 9, wherein the compressed image data is in an 8-bit JPEG (Joint Photographic Experts Group) format.

Clause 11. The method according to any one of clauses 1 to 7, wherein: the encoded image data comprises base image layer data representing a first dynamic range representation of the image; and the compressed image data includes additional image layer data for generating a second dynamic range representation of the image, the second dynamic range being larger than the first dynamic range, the method further comprising decoding the additional image layer data to generate decoded additional image layer data, the processing the first decoded image data comprising applying the decoded additional image layer data to generate the second decoded image data.

Clause 12. The method according to clause 11, wherein the compressed image data is in a more than 8-bit JPEG (Joint Photographic Experts Group) XT format.

Clause 13. The method according to any one of clauses 1 to 12, comprising compositing the second tone mapped image data with further display data representing at least one further display element to generate an output image.

Clause 14. A computing device comprising: storage for storing compressed image data comprising encoded image data representing an image; at least one processor communicatively coupled to the storage; a bit precision enlargement module configured to: decode the encoded image data to generate first decoded image data with a first bit precision; and process the first encoded image data to generate second decoded image data with a second bit precision higher than the first bit precision; a tone mapping module configured to: apply a tone mapping operation to the second decoded image data to generate first tone mapped image data with the second bit precision; and a bit precision reduction module configured to: convert the first tone mapped image data to second tone mapped image data with the first bit precision.

Clause 15. The computing device of clause 14, comprising a decoder module, the decoder module comprising the bit precision enlargement module, the tone mapping module and the bit precision reduction module.

What is claimed is:

1. A method of processing an image comprising:
receiving compressed image data comprising encoded image data representing the image;
decoding the encoded image data to generate first decoded image data with a first bit precision;
processing the first decoded image data to generate second decoded image data with a second bit precision higher than the first bit precision;

applying a tone mapping operation to the second decoded image data to generate first tone mapped image data with the second bit precision; and converting the first tone mapped image data to second tone mapped image data with the first bit precision.

2. The method according to claim 1, wherein the second bit precision is represented by a first series of bits providing the first bit precision and an additional one or more bits providing additional bit precision to form the second bit precision and wherein the method comprises, when converting the first tone mapped image data to the second tone mapped image data:

improving the display quality of the image when represented by the first series of bits by deriving information from the additional one or more bits for pixels in at least part of the image and using the information to alter the first series of bits for pixels in the at least part of the image; and discarding the additional one or more bits for the pixels in the at least part of the image.

3. The method according to claim 2, wherein the improving the display quality of the image represented by the first series of bits comprises applying a dithering operation to the first tone mapped image data.

4. The method according to claim 1, wherein the first bit precision is equal to a maximum bit precision displayable by a display device configured to display an output image based on the second tone mapped image data.

5. The method according to claim 1, wherein the tone mapping operation is performed by a decoder capable of decoding compressed images encoded at the first bit precision and of decoding compressed images encoded at the second bit precision.

6. The method according to claim 1, wherein the tone mapping operation reduces a dynamic range of the second decoded image data.

7. The method according to claim 1, wherein the applying the tone mapping operation comprises applying a spatially-variant tone mapping to the second decoded image data.

8. The method according to claim 1, wherein the processing the first decoded image data comprises applying one or more compression-noise reduction filters to the first decoded image data.

9. The method according to claim 8, comprising applying one or more smoothing filters to reduce banding noise in the first decoded image data.

10. The method according to claim 8, wherein the compressed image data is in an 8-bit JPEG (Joint Photographic Experts Group) format.

11. The method according to claim 1, wherein:
the encoded image data comprises base image layer data representing a first dynamic range representation of the image; and
the compressed image data includes additional image layer data for generating a second dynamic range representation of the image, the second dynamic range being larger than the first dynamic range,
the method further comprising decoding the additional image layer data to generate decoded additional image layer data, the processing the first decoded image data comprising applying the decoded additional image layer data to generate the second decoded image data.

12. The method according to claim 11, wherein the compressed image data is in a more than 8-bit JPEG (Joint Photographic Experts Group) XT format.

13. The method according to claim 1, comprising compositing the second tone mapped image data with further display data representing at least one further display element to generate an output image.

14. A computing device comprising:
storage for storing compressed image data comprising encoded image data representing an image;
at least one processor communicatively coupled to the storage;
a bit precision enlargement module configured to:
decode the encoded image data to generate first decoded image data with a first bit precision; and
process the first encoded image data to generate second decoded image data with a second bit precision higher than the first bit precision;
a tone mapping module configured to apply a tone mapping operation to the second decoded image data to generate first tone mapped image data with the second bit precision; and
a bit precision reduction module configured to convert the first tone mapped image data to second tone mapped image data with the first bit precision.

15. The computing device of claim 14, comprising a decoder module, the decoder module comprising the bit precision enlargement module, the tone mapping module and the bit precision reduction module.

16. The computing device of claim 14, wherein the second bit precision is represented by a first series of bits providing the first bit precision and an additional one or more bits providing additional bit precision to form the second bit precision and wherein the bit precision reduction module is configured to, when converting the first tone mapped image data to the second tone mapped image data:
improve the display quality of the image when represented by the first series of bits by deriving information from the additional one or more bits for pixels in at least part of the image and using the information to alter the first series of bits for pixels in the at least part of the image; and
discard the additional one or more bits for the pixels in the at least part of the image.

17. The computing device of claim 16, wherein the bit precision reduction module is configured to improve the display quality of the image when represented by the first series of bits by applying a dithering operation to the first tone mapped image data.

18. The computing device of claim 14, comprising a display device configured to display an output image based on the second tone mapped image data,
wherein the first bit precision is equal to a maximum bit precision displayable by the display device.

19. The computing device of claim 14, wherein the bit precision enlargement module is configured to apply one or more compression-noise reduction filters to the first decoded image data.

20. The computing device of claim 14, comprising a decoder module, wherein:
the encoded image data comprises base image layer data representing a first dynamic range representation of the image;
the compressed image data includes additional image layer data for generating a second dynamic range representation of the image, the second dynamic range being larger than the first dynamic range;
the decoder module is configured to decode the additional image layer data to generate decoded additional image layer data; and the bit precision enlargement module is configured to process the first decoded image data with the decoded additional image layer data to generate the second decoded image data.

* * * * *